Figure 1:
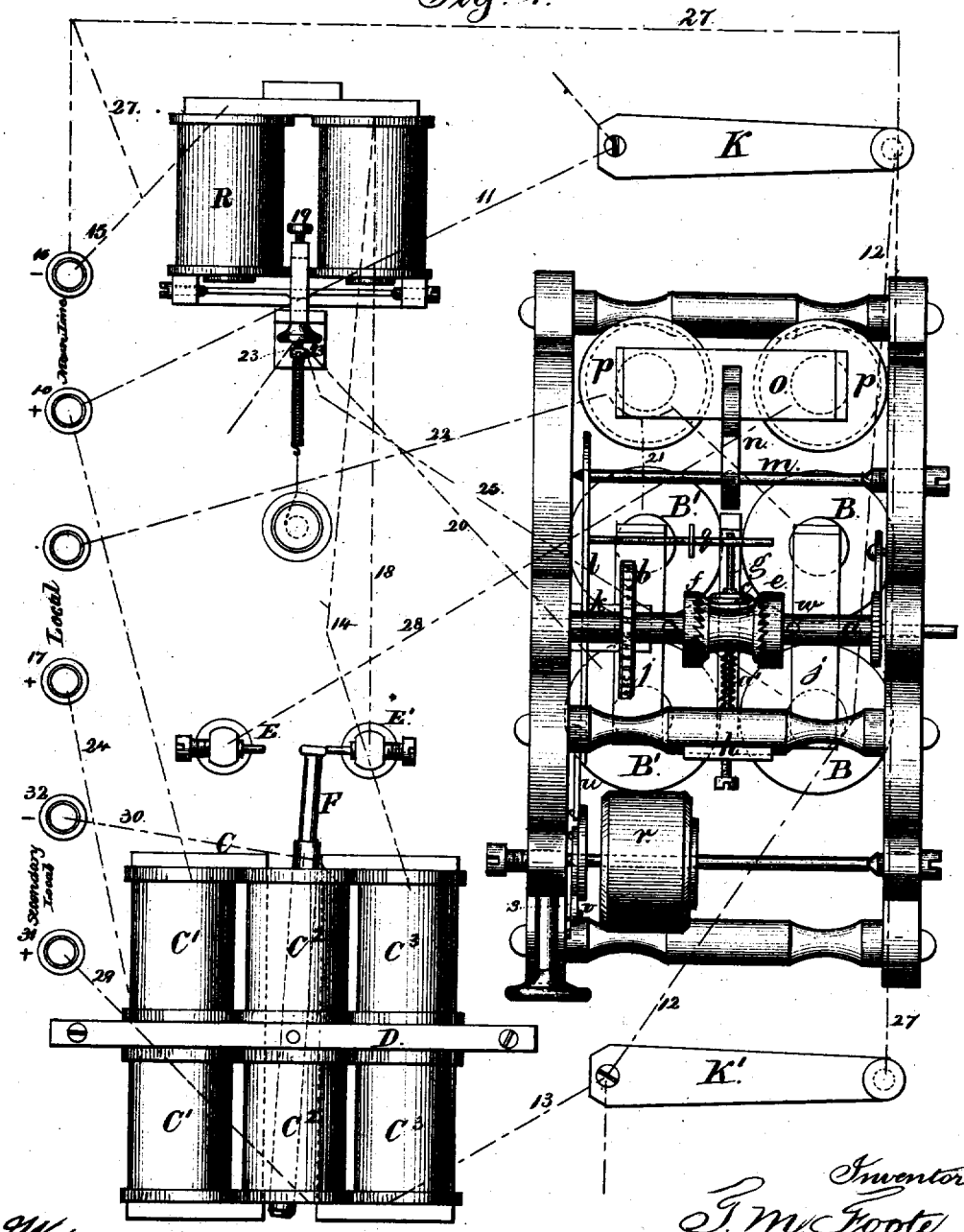

2 Sheets--Sheet 1.

T. M. FOOTE & C. A. RANDALL.

Telegraphic Printing-Apparatus.

No. 6,434. Reissued May 18, 1875.

Witnesses
Chas. H. Smith
Geo. T. Pinckney

Inventors
T. M. Foote
C. A. Randall
per Lemuel W. Serrell
Atty

THE NORRIS PETERS CO., PHOTO-LITHO., WASHINGTON, D. C.

2 Sheets--Sheet 2.
T. M. FOOTE & C. A. RANDALL.
Telegraphic Printing-Apparatus.
No. 6,434. Reissued May 18, 1875.
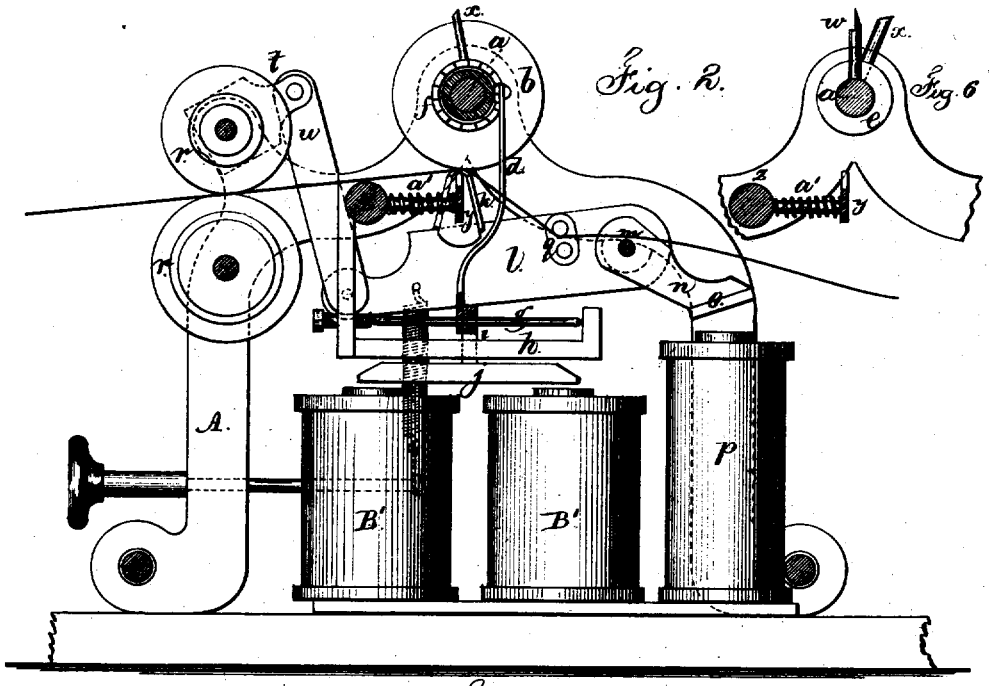
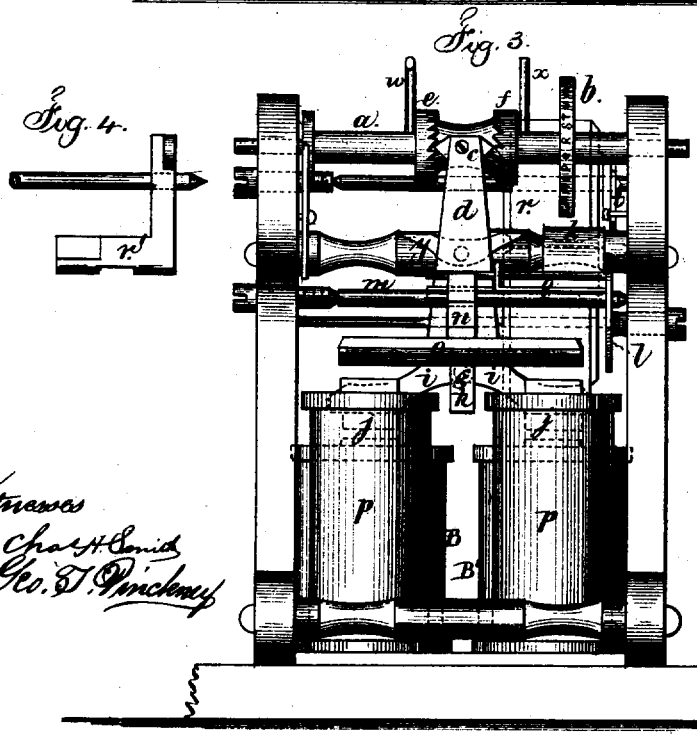
Witnesses
Chas. H. Smith
Geo. T. Pinckney
Inventors
T. M. Foote.
C. A. Randall
for L. W. Serrell
Att'y
THE NORRIS PETERS CO., PHOTO-LITHO., WASHINGTON, D. C.

UNITED STATES PATENT OFFICE.

THEODORE M. FOOTE AND CHARLES A. RANDALL, OF BROOKLYN, E. D., NEW YORK, ASSIGNORS, BY MESNE ASSIGNMENTS, TO THE GOLD AND STOCK TELEGRAPH COMPANY, OF NEW YORK CITY.

IMPROVEMENT IN TELEGRAPHIC-PRINTING APPARATUS.

Specification forming part of Letters Patent No. 105,060, dated July 5, 1870; reissue No. 6,434, dated May 18, 1875; application filed April 24, 1875.

*To all whom it may concern:*

Be it known that we, THEODORE M. FOOTE and CHARLES A. RANDALL, of Brooklyn, E. D., in the county of Kings and State of New York, have invented a new and useful Improvement in Telegraphic-Printing Apparatus, of which the following is a specification:

In the drawing, Figure 1 represents a plan or top view of our invention. Fig. 2 is a longitudinal vertical section of the same. Fig. 3 is an end view of the same. The remaining figures are details, which will be referred to as the description progresses.

Before our invention a step-by-step motion had been communicated to a type-wheel by wedge-acting pallets and two electro-magnets, as seen in the patent of G. M. Phelps, No. 91,662, June 22, 1869, and a unison mechanism had been employed with a separate magnet and line-wire, as in the patent of S. S. Laws of January 25, 1870, and also with a type-wheel revolved synchronously with the sending mechanism, as in English patent No. 2,373, of 1858, and in G. M. Phelps', No. 89,887.

Our invention relates to a unison-stop combined with the type-wheel that is rigidly connected with the shaft, and is brought into action by the movement of the type-wheel, and thrown out of action by the printing operation.

By this improvement we are enabled to dispense with separate lines to operate the unison mechanism, and also with the synchronous movements that have heretofore been employed with printing-telegraphs containing unison devices.

In the drawing, A designates a frame which forms the bearings for the working parts of our apparatus. In the upper part of this frame is secured the shaft *a*, on which is mounted the type-wheel *b*. A step-by-step motion is imparted to this shaft or to the type-wheel by an escapement, which consists of a double pallet, *c*, mounted on the end of a lever, *d*, and acting on two ratchet-wheels, *e f*, which are secured on the shaft *a*, and the teeth of which are shown as facing each other. The pallet-lever *d* is mounted on a rock-shaft, *g*, which has its bearings in a bracket, *h*, (see Fig. 2,) and from which extend two arms, *i i*, in opposite directions. (See Fig. 3.) To the arms *i i* are attached the armatures *j j* of the type-wheel magnets B B′. As the current is alternately made to pass through either one or the other pair of electro-magnets, an oscillating motion is imparted to the lever *d*, and the pallet *c* is caused to act alternately on the teeth of the ratchet-wheels *e f*, so as to propel the type-wheel shaft step by step, and retaining said shaft firmly in position as long as the pallet is in gear with either of the ratchet-wheels. By these means the type-wheel is moved so that the characters marked thereon are brought, in succession, over the platen *k*, and that each of said characters can be kept over said platen until an impression is taken. The platen is secured to the printing-lever *l*, which is mounted on a rock-shaft, *m*, having its bearings in the frame A. From this rock-shaft extends an arm, *n*, to which is secured the armature *o* of the printing-magnet *p*.

Whenever the current is made to pass through the printing-magnet the armature is attracted and the platen *k* is pressed up against the circumference of the type-wheel.

The strip of paper on which the impressions are made is taken from a roll (not shown in the drawing) and drawn through between guide-pins *q* projecting from the printing-lever, thence over the platen *k* and through between the feed-rollers *r r*. These feed-rollers are made of india-rubber or other soft and elastic material, and they are placed so close together that they take hold of the strip of paper and compel the same to advance whenever a motion in the proper direction is imparted to them.

On the shaft of the upper feed-roller is mounted a ratchet-wheel, *s*, and a lever-pawl, *t*, which connects, by a rod, *u*, with the printing-lever. For each oscillation of said printing-lever, therefore, the feed-rollers are propelled the required distance, and the strip of paper is drawn along so as to leave the proper spaces between subsequent impressions taken thereon. A stop-pawl, *v*, applied to the ratchet-wheel *s* prevents a retrograde motion of the feed-rollers. Instead of using two elastic rollers only one such roller may be used in connection with a presser-foot, $r'$, (see Figs. 4 and 5,) which receives an oscillating motion from the printing-lever, and the working surface of which is made rough, in such a manner that it acts on the paper in one, and slides over the same in the opposite, direction. From the type-wheel shaft project two pins, $w$ $x$, one of which is slightly in advance of the other. These pins act in conjunction with an anchor, $y$, in the following manner: Said anchor is mounted on the end of a pin projecting from a traverse, $z$, of the frame A, (see Fig. 6,) and it is subject to the action of a friction-spring, $a'$, so that it will remain in any position into which it may be brought. As the type-wheel shaft revolves the pin $x$ (which we term the pallet-pin, and the end of which is beveled off,) strikes one arm of the anchor, and depresses the same, thereby raising the other arm of the anchor in such a position that the flat end of the stop-pin $w$ will come in contact with the same. By these means the type-wheel shaft is arrested once for each full revolution, and the correct position or starting-point of the type-wheel can be determined.

In order to release the type-wheel shaft, the impression mechanism must be operated, and in so doing the platen $k$ is brought in contact with the depressed arm of the anchor, and its other arm is thrown out of the path of the stop-pin $w$. By this mechanism two or more machines working in the same circuit are readily kept in unison.

In operating our telegraphic printing apparatus, we prefer to employ a compound helix, C, composed of three pairs of electro-magnets, $C^1 C^1$, $C^2 C^2$, and $C^3 C^3$, which are arranged in two rows, as shown in Fig. 1, with an intervening supporting-bar, D. Through the core of the middle pair of magnets $C^2 C^2$ extends the switch-bar F, which is hinged to the supporting-bar D, so that its tip can be brought in contact with either of the circuit-closing points E or E'. The connection of this compound helix with the battery, and with the keys K K' and magnets B B' $p$ of the printing apparatus, and with the relay R, are such that the current can be passed through the compound helix in opposite directions, and thereby the switch-bar brought in contact either with the point E or with the point E'. When the switch-bar is in contact with the point E' and the key K is depressed the line-current passes in through the post 10 and wire 11 to the key K, through this key and wires 12 to 13 to the helices of the magnets $C^3$ and $C^1$, (which are connected,) thence through wire 14 to the helix of the relay R, and through this helix and the wire 15 to the post 16, which, in this case, represents the negative pole of the line.

The armature of the relay is attracted and the local current passes from its positive pole 17 through wire 24 to the partition-bar D of the compound helix; thence through the switch-bar F, point E', and wire 18 to the armature-lever of the relay, which, being attracted by the relay-magnets, is in contact with the screw 19; through this screw and the wire 20 to the type-wheel magnets B', the helix of which connects, by wires 21 and 22, with the negative pole of the local battery.

When the key K is raised, the circuit of the line-current through the relay-magnets is broken, the relay-armature falls back against the screw 23, which is insulated from its post, and consequently from the screw 19, and the local current passes from its positive pole 17, through wire 24, partition-bar D, switch-bar F, point E', and wire 18, through the armature-lever of the relay-magnets to the insulated screw 23, thence through wire 25 to type-wheel magnets B B, the helix of which connects, by wire 2 2, with the negative pole of the local battery.

By this arrangement the type-wheel is moved when the key K is depressed, and it is again moved when the key K is raised; or, in other words, the type-wheel is moved each time the main circuit is closed, and then again, if the main circuit is opened by the direct action of two pairs of magnets, and much time is saved in the operation of the apparatus.

The connection and operation of the printing-magnets depend upon the key K', as follows: If this key is depressed, the main circuit passes from the post 10, through the wire 26, to the helix of the electro-magnets $C^1$ $C^3$, thence through wire 13 to the key K', through this key and the wires 27 and 15, back to the negative pole 16 of the main circuit. The current through the magnets $C^1$ $C^3$, being thus reversed, causes the switch-bar F to swing against the point E, and the local current passes from post 17, through wire 24, switch-bar F, point E, and wire 28, to the helix of the printing-magnets, and thence through 22, to the negative of the local battery, the current being entirely cut off from the type-wheel magnets. The helix of the central magnets $C^2$ of the compound helix connects by wires 29 and 30, with posts 31 and 32, which represent the positive and negative poles of a secondary local battery, so that, if desired, the position of the switch-bar F can be changed simply by reversing the current of this secondary local battery.

What we claim as new, and desire to secure by Letters Patent, is—

1. A type-wheel rigidly secured to its shaft, and controlled by an escapement and step-by-step motion, in combination with a unison-stop that is disconnected by the printing mechanism, substantially as described.

2. The combination, with a printing-telegraph instrument, of a unison that arrests the movement of the type-wheel shaft, an electro-magnet, to throw the unison out of action, and one main-line circuit, substantially as specified.

3. In a printing-telegraph, the unison mechanism brought into action by the type-wheel or its shaft, to arrest the movement of such type-wheel, substantially as specified.

4. In a printing-telegraph instrument, a type-wheel and its shaft rigidly secured together, in combination with an escapement for moving or controlling the type-wheel, a unison mechanism for adjusting or setting the type-wheel, and an electro-magnet for effecting the printing, all automatically controlled from the sending-station through one main circuit.

5. In a printing-telegraph instrument, a type-wheel, in combination with a unison that operates to stop both the type-wheel and the motor that carries the same when the unison is effected, substantially as specified.

6. A compound helix, consisting of three pairs of electro-magnets, $C^1$ $C^1$ $C^2$ $C^2$ $C^3$ $C^3$, having a switch-bar, F, passing through the core of the middle pair $C^2$ $C^2$, in combination with the relay-magnet, type-wheel, and printing-magnets, and circuit-connections, arranged and operating substantially as set forth.

7. The double pallet *c*, oscillating between the teeth of the ratchet-wheels *e f*, that face each other upon the type-wheel shaft *a*, in combination with the magnets B B′, substantially as and for the purpose described.

8. The oscillating anchor *y*, and pins *w x*, in combination with type-wheel shaft, and with the printing-lever, or any part connected to the same, substantially as and for the purposes set forth.

9. A paper-feeding mechanism, composed of one elastic roller, and a second roller or an oscillating foot, and operated from the printing-lever of the telegraphic-printing apparatus, as herein described.

Signed by us this 21st day of April, A. D. 1875.

THEODORE M. FOOTE.
CHARLES A. RANDALL.

Witnesses:
GEO. T. PINCKNEY,
CHAS. H. SMITH.